AUTOMATIC RECORD CHANGER SPEED CONTROL

Filed Aug. 7, 1956 2 Sheets-Sheet 1

INVENTOR:
EDWIN S. BARA
BY
[signature]
ATT'Y

Oct. 3, 1961 E. S. BARA 3,002,758

AUTOMATIC RECORD CHANGER SPEED CONTROL

Filed Aug. 7, 1956 2 Sheets-Sheet 2

INVENTOR:
EDWIN S. BARA
BY Watson D. Harbaugh
ATT'Y 3,002,758
Patented Oct. 3, 1961

3,002,758
AUTOMATIC RECORD CHANGER SPEED CONTROL

Edwin S. Bara, Chicago, Ill., assignor to Webcor, Inc., Chicago, Ill., a corporation of Illinois Filed Aug. 7, 1956, Ser. No. 602,650
16 Claims. (Cl. 274—10)

This invention relates to sound reproducing apparatus and more particularly to an automatic record changer of the multi-speed type in which record tablets of different diameters may be reproduced indiscriminately and wherein the turntable speed may be varied automatically in response to the diameter of the record tablet deposited on the turntable upon initiation of a cycle of automatic operation. This invention is an improvement over the inventions disclosed in the application of John Cleybergh, Serial No. 587,983, filed May 29, 1956, the disclosure of which is incorporated herein by reference.

A principal object of the invention is to provide an automatic record changer of the character described wherein the turntable speed may be varied automatically to accommodate record tablets whose requisite reproducing speeds are characteristic of their diameters.

A further object of the invention is to provide an automatic record changer of the stated type wherein a tone arm control mechanism is indexed to correspond with the diameter of a particular record tablet deposited on the turntable, and in which the automatic speed changing mechanism is coordinated to the position of the tone arm control.

Another object of the invention is to provide an automatic record changer with a plurality of speeds in excess of two wherein certain speeds are selected automatically in accordance to the size of the record tablet and other speeds are selected manually independently of the size of the record tablet.

A further object of the invention is to provide an automatic record changer in which the speed of the turntable may be changed automatically without stalling or hesitation and in which power is available throughout the record changing cycle to change the speed of the turntable.

Another object of the invention is to provide an automatic record changer of the character described which is characterized by convenience in form, ease of manufacture, and efficiency and reliability of operation.

Other and further objects, advantages and features of the present invention will be apparent to those skilled in the art from the following description, taken in conjunction with the accompanying drawings in which similar reference characters relate to similar parts and in which.

Figure 1:
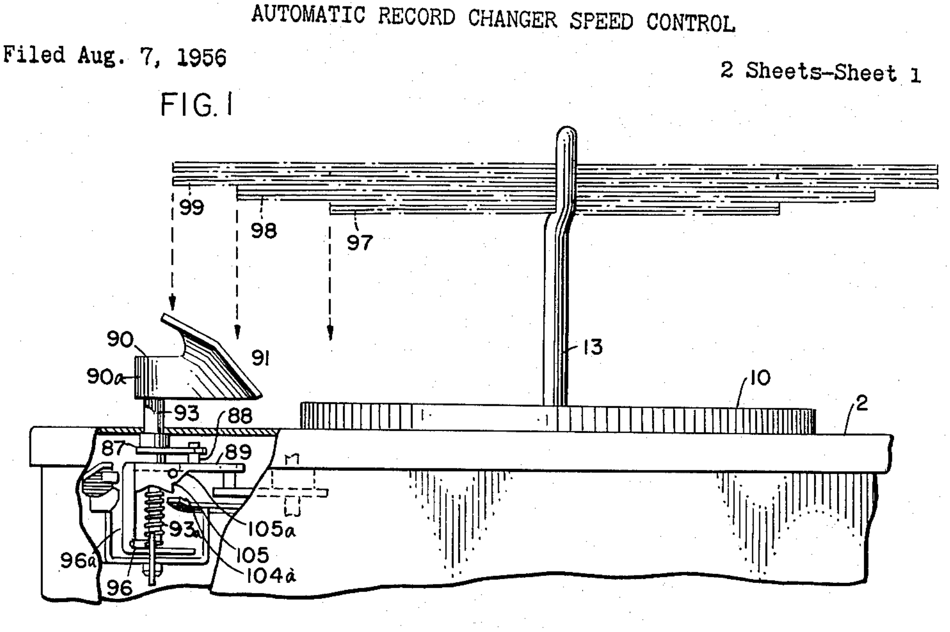
FIG. 1 is an elevational view, partly broken away and partly in section, of an automatic record changer made in accordance with the present invention and showing a portion of the speed control mechanism.
Figure 2:
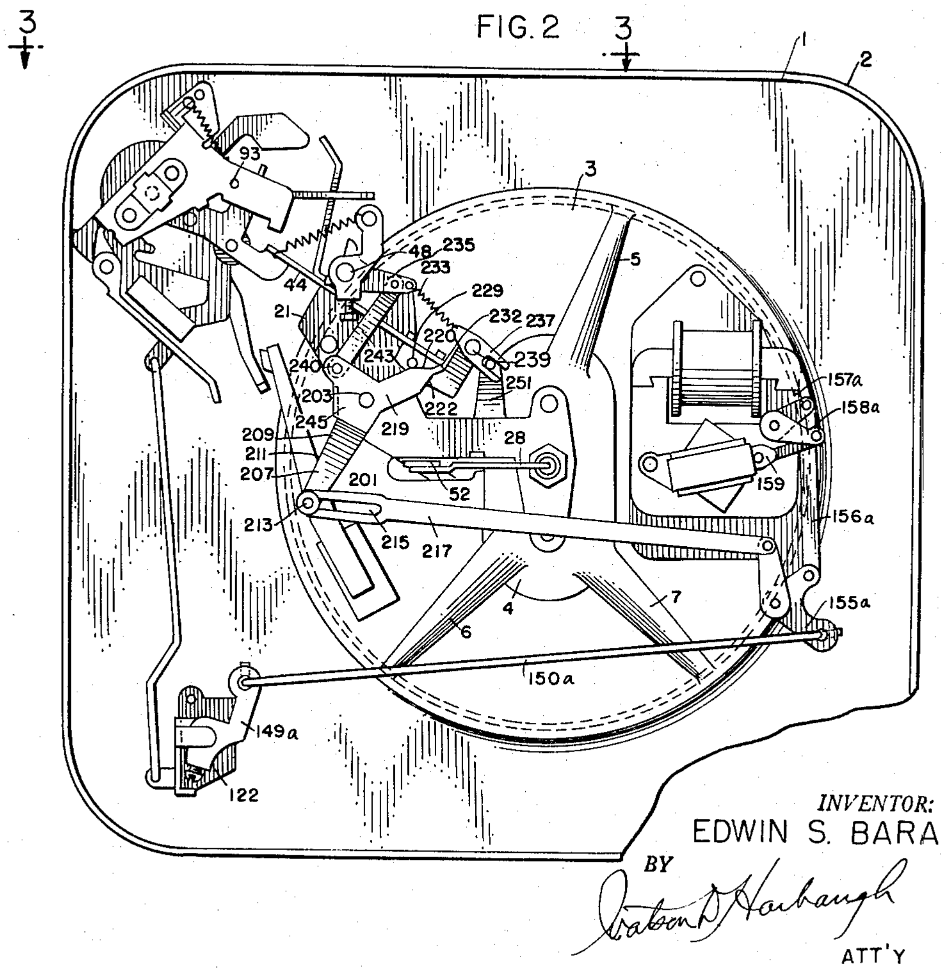
FIG. 2 is a bottom plan view of the record changer of FIG. 1 showing the speed control mechanism in operative position.

Referring now to the drawings and more particularly to FIGS. 1 and 2, the automatic record changer of the present invention comprises a motorboard 1 of thin sheet metal stiffened by a marginal flange 2, and having a central well 3 in which a turntable 10 is rotatably mounted about a non-rotating spindle mechanism 13 of the type shown in said Cleybergh application. The central well 3 is provided with an oblong depression 4 connected with the marginal edges of the well by means of a plurality of radially extending channel corrugations 5, 6 and 7.

The lower end of the spindle assembly 13 is connected at one end to a rocker arm 28 pivotally mounted to the undersurface of the motorboard 1 to actuate the record dropping mechanism. The other end of the rocker arm 28 carries a roller 52 which extends through a suitable opening in the motorboard 1 and into engagement with a cam path (not shown) formed on the under side of a main central cam gear 29, shown fragmentarily in FIG. 3. The cam path has a rise surface for cyclic operation of the spindle assembly upon rotation of the cam gear 29. The cam rise is so located as to time the record drop with a series of operations which include the initiation of rotation of the cam gear 29 at the termination of the reproduction of a record, raising a tone arm (not shown) to a substantially horizontal position, swinging the tone arm outwardly to its limit position, and swinging the tone arm inwardly to a position corresponding to the initial reproducing position of a record of a particular diameter. For the latter purpose, an indexing assembly 90 (FIG. 1) is provided for limiting the backswing of the tone arm. As in the applications of Colin B. Dale, Serial No. 446,469, and the application of Edwin S. Bara, Serial No. 552,827, the indexing assembly 90 includes a flag **90*a* mounted on a shaft 93. The flag 90*a* has an inclined face 91 which may be engaged either by a 10-inch record, indicated by reference numeral 98, or by a 12-inch record, indicated by reference numeral 99. A 7-inch record, such as indicated by reference numeral 97, preferably does not engage the sloping face 91 of the flag 90*a***, and in this connection it should be noted that the tone arm normally is carried inwardly to a position just inside the periphery of a 7-inch record.

The indexing assembly 90 normally rests during reproduction of a record tablet in a position in which the flag **90*a* is clear of the periphery of even a 12-inch record. By this arrangement, any record tablet regardless of the size may be removed manually without interference from the flag 90*a*. At the initiation of an automatic cycle of operation, however, the flag 90*a* is automatically moved to the record interference position shown in FIG. 1. If a 10-inch record is dropped, its edge contacts and cams the flag outwardly enough to fall clear of it. The shaft 83 is rotated a predetermined distance by this camming and, consequently, the inward movement of the tone arm is limited by a stepped stop, described clearly in the application of Colin B. Dale, Serial No. 446,469 and the application of Edwin S. Bara, Serial No. 552,827, the disclosures of which are incorporated herein be reference, in suitable position so that the tone arm is dropped in the proper position for a 10-inch record. Likewise, the dropping of a 12-inch record cams the flag outwardly further than the 10-inch record does and rotates the shaft 93 a greater distance with the result that the travel of the tone arm is limited by a stepped stop in another position and the tone arm is dropped in the proper place to reproduce a 12-inch record. After a record has been deposited on the turntable, the flag 90*a*** is again moved to its outermost position.

At the initiation of each automatic cycle, the cam gear 29 is roated one full revolution. An undulating groove 43 is formed in the cam gear 29. The groove 43 has an axial component of follower movement as well as a radial component. In the groove 43 rides a cam follower pin 42 which is mounted on the inner end of a rocker arm 44 pivotally mounted on a bracket 47 which in turn is rotatably mounted on a stub shaft 48. The stub shaft 48 is fixedly secured to a reinforcing plate 21 attached to the underside of the motorboard 1. The movement of the pin 42 within the groove 43 provides radial as well as lateral movement of the rocker arm 44 to afford four operations, namely an upward movement to lift the tone arm and clear the turntable; movement of the tone arm radially outwardly to an inoperative or resting position in which another record tablet may be deposited on the turntable by drop mechanism; movement of the tone arm back to a position above the record tablet; and, lowering the arm to its sound reproduction contact with the sound track of the record tablet.

At the outer end of the rocket arm 44 there is formed a lever 104 (see FIG. 1) which is operative to actuate the indexing assembly as the rocker arm 44 moves vertically and horizontally in response to the movement of the pin 42 in the undulating groove 43 in the cam gear 29. To this end, a channel-shaped bracket 96 is mounted upon the shaft 93 and is normally urged into the lower position shown in FIG. 1 by means of a spring 93*a*. A latch or toggle 105 is pivotally mounted on one side of the bracket 96 on a stepped cam plate 89 forming the upper arm of the bracket 96.

The toggle 105 has a shoulder 105*a* which engages the undersurface of the cam plate 89 to prevent counter-clockwise rotation of the toggle, as viewed in FIG. 1. On its lower edge, the toggle 105 has a projection 105*b*. As the lever 104 moves upwardly in response to the movement of the pin 42 in the groove 43 its upturned end 104*a* locks behind the projection 105*b*, and as the lever 104 moves transversely, it urges the bracket 96 in a counter-clockwise direction as viewed from the top in FIG. 1.

This motion is transmitted to the shaft 93 by means of a pin 88 mounted on the top surface of the cam plate 89. The pin 88 is received in a slot formed in the outer end of a crank 87 which is fixedly secured to the shaft 93.

As the flag 90*a* is thus brought to its innermost position, the end 104*a* of the lever 104 slips from under the point of the projection 105*b* and the bracket 96 is again returned to its lower position by the force of the spring 93*a*. If a 10-inch record should be dropped, the impact on the flag 90*a* rotates the shaft 93, and consequently the bracket 96, in a clockwise direction, as viewed from the top in FIG. 1, so that a higher shoulder of the stepped cam plate 89 is presented to interfere with the motion of pin 103 mounted on a lever 63 forming part of the tone arm assembly. As explained before, this shoulder is calibrated so that the tone arm is dropped in the proper position to initiate sound reproduction of a 10-inch record. When the tone arm drops into operative position, the lever 63 also drops to a position in which the pin 103 is out of interfering relation with the cam plate 89, and the tone arm is free to track in the grooves and traverse a record tablet.

As the pin 103 moves into contact with one of the shoulders on the cam plate 89, the lever 104 is moved laterally into contact with the inner face of the projection 105*b*. The toggle 105 is thus rotated in a clockwise direction until the end 104*a* of the lever 104 again assumes a locking relation with respect to the projection 105*b*. As the lever 104*a* moves to the left, as viewed in FIG. 1, it engages a side edge 96*a* of the bracket 96 to rotate the bracket 96, and consequently the flag 90*a* in a clockwise direction, as viewed from the top in FIG. 1, until the flag 90*a* assumes its outer position clear of even the 12-inch records. In the present invention, the speed of the turntable is changed automatically to correspond with the diameter of the record deposited on the turntable. A 7-inch record is conventionally recorded at 45 r.p.m. A large majority of the 10-inch and 12-inch records made today are recorded at 33⅓ r.p.m. Some of the older 10-inch and 12-inch records are recorded at 78 r.p.m. and provision is made for manual control to reproduce these records at their correct speed. This is done by a manual manipulation that does not form a part of this invention but will be described hereafter. By the present arrangement, the turntable speed may be changed from its normal 45 r.p.m. setting to a setting for reproduction at 33⅓ r.p.m. when a 10-inch or 12-inch record is dropped. As pointed out above, the flag 90*a*, at the initiation of each automatic cycle, automatically moves into a position in which the tone arm will be moved inwardly the proper distance to reproduce a 7-inch record at 45 r.p.m.

Figure 3:
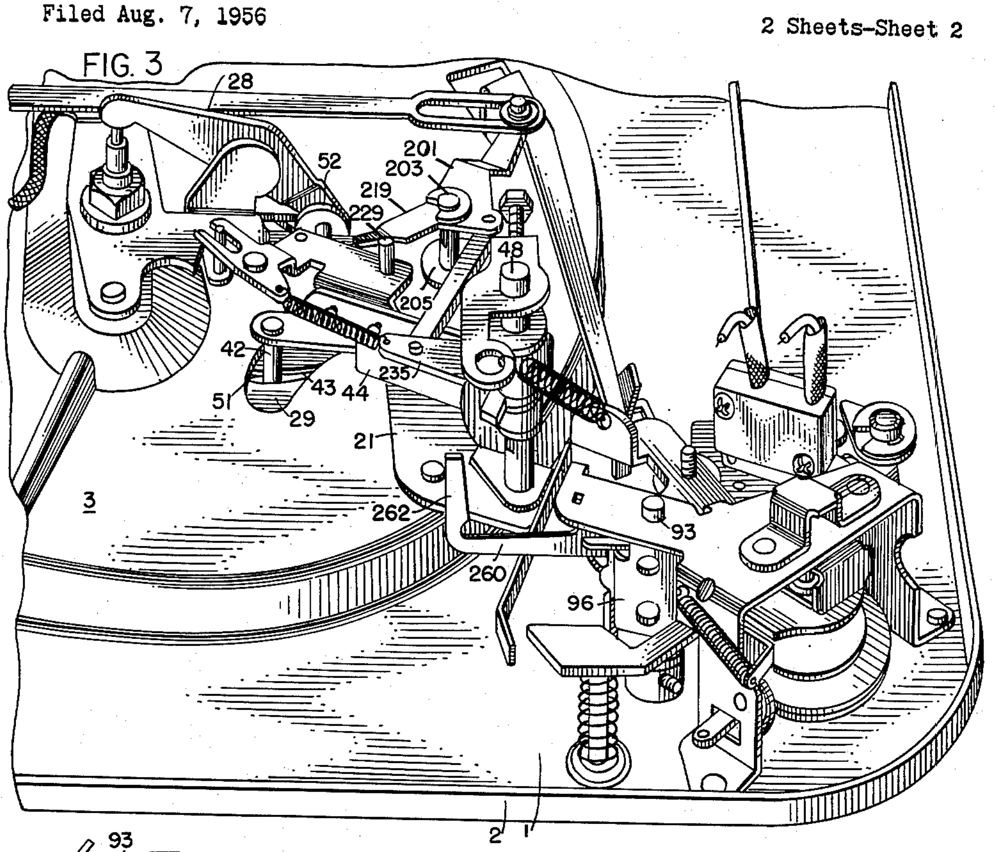
FIG. 3 is a view in perspective of the automatic speed changing mechanism of the present invention shown in operative relation to the tone arm control mechanism and the indexing assembly therefor.

Referring now more particularly to FIGS. 2 and 3, there is shown a mechanism for automatically changing the speed of the turntable to rotate at 33⅓ r.p.m. if a 10-inch or 12-inch record strikes the inclined face 91 of the flag 90*a* as it drops onto the turntable, and for changing the speed of the turntable back to 45 r.p.m. at the initiation of each automatic cycle.

The mechanism for accomplishing this speed change includes a bell crank 201 rotatably mounted on a shaft 203 affixed to the plate 21 in spaced relation to the stub shaft 48. To assure movement of the bell crank 201 in a horizontal plane only, a bracket 205 is formed integrally with the bell crank and has a portion extending substantially parallel therewith and apertured for reception of the shaft 203. The bell crank 201 is generally tripartite in construction and includes an elongate arm 207 having an angularly offset portion 209 and an end portion 211 to the outer end of which is secured a pin 213. The pin 213 is received in a slot 215 in a push rod 217 which is effective upon actuation to change the speed of the turntable in a manner hereafter described. The bell crank 201 is further provided with an arm 219 which, in the present instance, has an arrow-like point 221*a* defined by curvilinear cam surfaces 220 and 222 which are engaged by a mechanism hereafter described for rotation of the bell crank 201 in one direction or the other for movement of the rod 217 to the left, as viewed in FIG. 2, to change the turntable speed setting from 45 r.p.m. to 33⅓ r.p.m. when a record of 10-inch diameter strikes the sloping face 91 of the flag 90*a*, and for movement of the rod 217 to the right, as viewed in the same figure, to change the turntable speed setting from 33⅓ r.p.m. to 45 r.p.m. when a record of 7-inch diameter is dropped upon the turntable. The mechanism for effecting these results will now be described.

Figure 6:
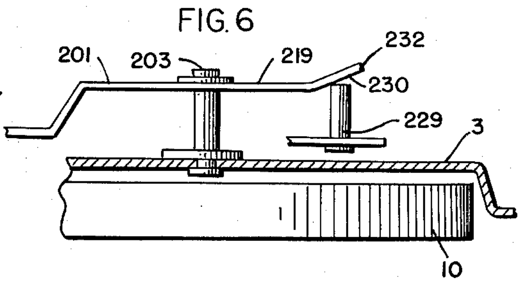
FIG. 6 is an inverted elevational view of the bell crank of FIG. 2 showing the driving pin in the position it assumes when retracting from the bell crank.

Referring now more particularly to FIG. 6, there is shown in this figure a speed control actuator assembly indicated generally by reference numeral 223. The assembly 223 is secured to one side of the inner end of the rocker arm 44 by means of screws 225, and comprises a bracket 227, movable with the action of the rocker arm 44 and a pin 229 secured thereto which engages the cam surfaces 220 and 222 on the arm 219 for rotation of the bell crank 201. The pin 229 is normally held in the position shown in FIG. 6 by the bracket 227 and the outer end thereof is upturned to provide an inclined surface 230 whose outer end clears the pin 229.

In FIG. 2 is shown the speed changing mechanism in the position it assumes when the turntable is set for 33⅓ r.p.m. The bell crank 201 is maintained in the position shown by the spring 233 connected at one end to a link 235 which is mounted for rotation on the stub shaft 48, and at the other end to a bifurcated lever 237 pivotally mounted by means of a pin 239 to an arm 251 forming an extension of the upper arm of the bracket 227. A link 243 connects the link 235 with an arm 245 on the bell crank 201.

Upon rotation of the rocker arm 44 in a clockwise direction, as viewed in FIG. 2, the pin 229 is moved into contact with the cam surface 220 on the arm 219. As the arm 227 moves with the rocker arm 44, tension is exerted on the spring 233 to urge the cam 220 into engagement with the pin 229. For this purpose, a pin 249, which is secured to a bracket 251 forming a part of the plate 21, is received within the bifurcated end of the lever 237. When the rocker arm 44 reaches the limit of its oscillation about the axis of the stub shaft 48, it is then rocked about a perpendicular axis in response to the contour of the groove 43 of the cam gear 29. As a result, the pin 229 is raised out of engagement with the cam surface 220 to afford a sudden snapping action of the bell crank 201 about its axis of rotation. As this snapping action occurs, the pin 229 rests in engagement with the top surface of the arm 219. Upon subsequent movement of the rocker arm 44 in a counterclockwise direction, as viewed in FIG. 2, the pin 229 slides off the inclined surface 230 (see FIG. 6) formed by bending the tip 232 of the arm 219 downwardly. By this arrangement, stalling of the speed changer mechanism due to jamming between the pin 229 and the arm 219 is effectively precluded. The pin 229 is again brought into position of engagement with one of the cam surfaces 220 or 222 when the adjacent end of the rocker arm 44 is moved downwardly in response to the contour of the groove 43. By this arrangement, the rocker arm 44 through the medium of the pin 229 rotates the bell crank 201 in one direction or the other to move the push rod 217 to the right or left, as viewed in FIG. 2, depending upon the position of the bell crank 201 when the pin 229 is brought into engagement with the arm 219, to change the speed of the turntable to correspond to the requisite reproducing speed of a record dropped upon the turntable. The direction of rotation of the bell crank 201 is dependent upon the position of the bell crank when the pin 229 is oscillated in a clockwise direction, as viewed in FIG. 2. The mechanism for determining the position of the bell crank 201 will now be described.

Figures 4, 5:
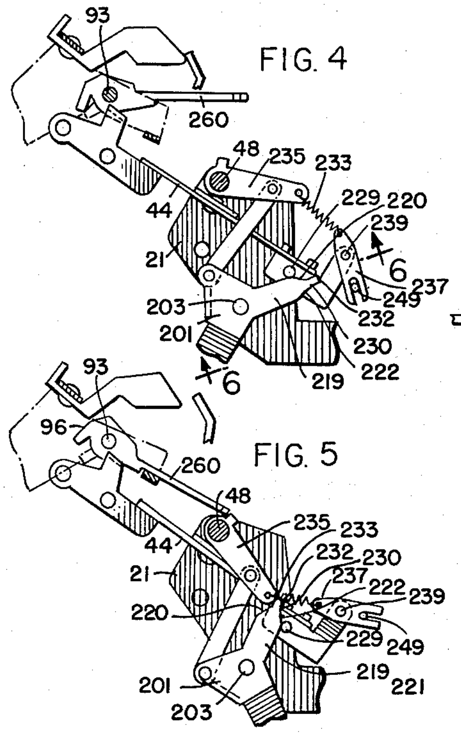
FIG. 4 is a fragmentary bottom plan view of the automatic speed changing mechanism in the position it assumes when a record of larger diameter is dropped upon the turntable.
FIG. 5 is a view similar to FIG. 4 but showing the automatic speed changing mechanism in the position it assumes when a record of smaller diameter is deposited on the turntable.

Referring now to FIGS. 3, 4 and 5 an arm 260 extends outwardly from the bracket 96 and has a depending portion 262 which in the innermost position of the flag **90*a* is brought to the position shown in FIG. 5. In this position, rotation of the lever 235 in a counterclockwise direction, as viewed in this figure, is prevented, and the bell crank 201 assumes a position in which the pin 229 engages the cam surface 222 of the arm 219 to afford counter-clockwise rotation of the bell crank and movement of the push rod 217 to the right, as viewed in FIG. 2, to change the speed of the turntable to 45 r.p.m. The arm 260 assumes the position shown in FIG. 5 only momentarily, i.e., the length of time that the flag 90*a* is in its innermost position. During this interval, further rotation of the lever 235 about the axis of the stub shaft 48 is prevented and the pin 229 engages the arm 219 in the position shown in FIG. 5. In the event that a 10-inch record is dropped upon the turntable, the lever 235 may rotate to the position shown in FIG. 4 and the bell crank 201 assumes the position shown in that figure. In this position, the pin 229 engages the other side of the arm 219 and effects clockwise rotation of the bell crank 201 and movement of the push rod 217 to the left, as viewed in FIG. 2, to change the speed of the turntable to 33⅓ r.p.m. The lever 235, of course, is freely rotatable on the stub shaft 48 and, upon oscillation of the rocker arm 44 in a counter-clockwise direction the bifurcated lever 237 is brought to the position shown in FIG. 4 because of the varying relative positions of the pins 239 and 249. In moving to this position, movement of the lever 235 and the bell crank 201 to the positions shown is afforded. When rotation of the lever 235 is precluded by the position of the arm 260 the bifurcated lever 237 assumes the position shown in FIG. 5 and the bell crank 201 is brought to a position in which the cam 222 is engaged by the pin 229**.

Movement of the push rod 217 to the right, as viewed in FIG. 2, effects clockwise rotation of a bell crank **155*a*, downward movement of a link 156*a*, clockwise rotation of a link 157*a*, and similar movement of a link 158*a* for inwardly movement of a stepped cam 159, similar to that described in the applications to Dale and Bara. The stepped cam 159 raises or lowers the shaft of a motor 152 for selective engagement of steps of varying diameters on the shaft with a friction wheel (not shown) which drives the turntable. Preferably the steps of the cam 159 are joined by inclined faces to facilitate axial movement of the motor shaft. The lower end of the motor shaft is at all times in engagement with either the cam steps or the inclined faces. Clockwise rotation of the bell crank 155*a* effects movement of a push rod 150*a* to the left, as viewed in FIG. 2, to rotate a lever 149*a* forming part of a speed selector assembly 122** in a counter-clockwise direction to a predetermined position calibrated for 45 r.p.m. on the opposite side of the motorboard.

As set forth above, the arm 260 is brought to the position shown in FIG. 4 when a record of a diameter greater than 7 inches is dropped upon the turntable. This affords rotation of the lever 235 to the position shown in this figure, and the bell crank 201 is brought to a position in which engagement of the arm 219 by the pin 229 effects clockwise rotation of the bell crank and movement of the push rod 217 to the left, as viewed in FIG. 2. The elements **155*a*, 156*a*, 157*a*, 158*a*, and 150*a* are moved oppositely and the stepped cam 159 is moved outwardly to a position corresponding to 33⅓ r.p.m. rotation of the turntable, and the lever 149*a*** is returned to the position shown in FIG. 2.

As in the inventions of Dale and Bara, the stepped cam 159 is provided with four steps for rotation at 16 r.p.m., 33⅓ r.p.m., 45 r.p.m. and 78 r.p.m. For rotation of the turntable at 16 r.p.m. and 78 r.p.m. the lever **149*a* is rotated by a manual control knob (not shown) forming a part of the assembly 122 so that the appropriate steps of the cam 159** are positioned beneath the shaft of the motor.

The present invention is characterized in that the speed of the motor drive is changed only in the event that the next succeeding record tablet requires such a change. While the indexing mechanism sets the return of the tone arm for reproduction at 45 r.p.m. at the initiation of each automatic cycle, the speed of the turntable is changed only in the event that the next succeeding record is of a different diameter from that just played. For example, should a record of 10-inch diameter be dropped on the turntable, the bell crank 201 will assume the position shown in FIG. 4 and the push rod 217 will be moved to the left to change the speed of the motor to 33⅓ r.p.m. If the next record is also 10 inches in diameter, the position of the stepped cam 159 remains unchanged. If the next record is 7 inches in diameter, the bell crank 201 will assume the position shown in FIG. 5 and the cam 159 will be moved to a corresponding position until a record of a diameter greater than 7 inches is dropped upon the turntable.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. In a record changer having automatic operating cycles for the sequential playing of a plurality of record tablets of different diameters and reproducing speeds respectively corresponding to the diameters thereof, a rotatable turntable having means for releasably supporting a stack of record tablets thereabove and means for droping one of said tablets on said turntable during each operating cycle, a transducer-equipped tone arm adapted for vertical and horizontal swinging movement relative to said turntable, the combination of indexing means having a normal position and a position corresponding to each of a plurality of record diameters and comprising a flag engaged by record tablets dropped onto said turntable to effect a positioning of said indexing means corresponding to the diameter of each record tablet engaging said flag, means operable at the beginning of each cycle for operating said indexing means from said normal position to the position thereof corresponding to the smallest diameter record tablet in said stack, means for varying the speed of said turntable including an element reciprocated each cycle and a crank movable to alternate positions and having two spaced cam surfaces engaged by said element, means actuated by said indexing means in response to the position thereof following the dropping of a record for urging said tone arm into an initial reproducing position corresponding to the diameter of the record tablet so dropped on the turntable during a cycle, and means operable in response to the position of said indexing means for removing said speed varying means from operation in one position of said indexing means.

2. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a transducer equipped tone arm adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each cycle for operating said indexing means from said normal position to the position thereof corresponding to the smallest diameter record tablet in said stack, said last mentioned means comprising a cam actuated rocker arm having vertical and horizontal movement for raising said tone arm and swinging the same to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, means for varying the speed of said turntable from a predetermined speed corresponding to the speed of the smallest record and means operable in response to the innermost position of said indexing means following the dropping of a record tablet for removing said speed varying means from operation.

3. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a transducer-equipped tone arm adapted for vertical and horizontal swinging movement relative to said turntable, indexing means having a normal position and a plurality of positions corresponding to each of a plurality of record diameters and being moved into such latter positions in response to records dropped onto said turntable and in correspondence with the respective diameters thereof, means operable at the beginning of each cycle for moving said indexing means from said normal positions to the position thereof corresponding to the smallest diameter record tablet in said stack, said last mentioned means comprising a cam actuated rocker arm having vertical and horizontal movement for raising said tone arm and swinging the same to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, means operable in response to the position of said indexing means following the dropping of a record tablet for varying the speed of said turntable to the speed associated with the diameter of the record dropped, and means controlled by said indexing means for removing said speed varying means from operation when said indexing means is in its smallest record position, said last-named means being operable in response to the movement of said rocker arm.

4. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a transducer-equipped tone arm adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each cycle for operating said indexing means from said normal position to the position thereof corresponding to the smallest diameter record tablet in said stack, said last mentioned means comprising a cam actuated rocker arm and element having vertical and horizontal movement for raising said tone arm and swinging the same to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameter of the record dropped, said last-named means comprising a mechanism including a bell crank rotatably mounted and having an arm with oppositely facing cams in the path of horizontal travel of said element on said rocker arm, said bell crank being selectively positionable by said indexing means so that it is rotated enough to bring one of said cams into the path of movement of said element to be moved thereby in one direction or the other to decrease or increase the speed of the turntable, said element being moved from said path of horizontal travel with vertical movement of the rocker arm.

5. An automatic record changer for the sequential playing of a plurality of records of different diameters and reproducing speeds respectively corresponding to the diameters thereof, comprising a rotatable turntable having means for releasably supporting a stack of record tablets above the turntable and means for dropping one of said tablets on said turntable during an automatic record changing cycle, a transducer-equipped tone arm adapted for vertical and horizontal swinging movement relative to said turntable, indexing means having a normal position and a position corresponding to each of a plurality of record diameters and being moved to such latter positions in response to records dropped onto said turntable and in correspondence with the respective diameters thereof, normally inoperative means for changing the speed of said turntable to correspond such speed to the requisite reproducing speed of a record tablet of a diameter greater than a particular diameter, means operable at the beginning of each cycle for operating and indexing means from said normal position to the position corresponding to the smallest diameter record tablet in said stack and for setting the speed of said turntable to the requisite speed of said smallest diameter record tablet, said last mentioned means comprising a cam actuated rocker arm having vertical and horizontal movement, said rocker arm being further operative upon actuation thereof to raise said tone arm and swing the same to an inoperative position at the initiation of each automatic record changing cycle, said indexing means being operative to limit the backswing of said tone arm during the movement thereof from said inoperative position to an operative position corresponding to the initial reproducing position of a record tablet of larger diameter than that of the smallest record in said stack in the event that such a larger record is dropped on the turntable during a particular record changing cycle, said speed changing means being operative in response to the resulting position of said indexing means following the dropping of a record tablet other than that of the smallest size to change the speed of the turntable to the speed associated with the diameter of the record dropped.

6. An automatic record changer for the sequential playing of a plurality of records of different diameters and reproducing speeds respectively corresponding to the diameters thereof, comprising a rotatable turntable having means for releasably supporting a stack of record tablets above the turntable and means for dropping one of said tablets on said turntable during an automatic record changing cycle, a transducer-equipped tone arm adapted for vertical and horizontal swinging movement relative to said turntable, indexing means having a normal position and a position corresponding to each of a plurality of record diameters and being moved to such latter positions in response to records dropped onto said turntable and in correspondence with the respective diameters thereof, means for changing the speed of said turntable to correspond such speed to the requisite reproducing speed of a record tablet of a particular diameter including a crank having a cam, means operable at the beginning of each cycle for moving said indexing means from said normal position to an inner position corresponding to the smallest diameter record tablet in said stack and for setting the speed of said turntable to the requisite speed of said smallest diameter record tablet, said last-mentioned means comprising a cam actuated rocker arm having vertical and horizontal movement and an element subject thereto for actuating said crank cam, said rocker arm being further operative upon actuation thereof to raise said tone arm and swing the same to an inoperative position at the initiation of each automatic record changing cycle, said indexing means being operative to limit the backswing of said tone arm during the movement thereof from said inoperative position to an operative position corresponding to the initial reproducing position of a record tablet of larger diameter than that of the smallest record in said stack in the event that such a larger record is dropped on the turntable during a particular record changing cycle, said indexing means including a flag disposed in the path of fall of record tablets of larger diameter for determining the limit position of said tone control arm and an element for obstructing operation of said speed changing means when said flag is in its innermost position, said speed changing means being operative in response to the position of said indexing means following the dropping of a record tablet engaging said flag for disposing the crank cam in the path of movement of the first-mentioned element to change the speed of the turntable to the speed associated with the diameter of the larger record dropped.

7. In a record changer having automatic cycles for the sequential playing of a plurality of record tablets of different diameters and reproducing speeds respectively corresponding to the diameters thereof, a rotatable turntable having means for releasably supporting a stack of record tablets above the turntable during each cycle, a tone arm adapted for vertical and horizontal swinging movement relative to said turntable, the combination of indexing means having a normal position and a position corresponding to each of a plurality of record diameters and being moved into such latter positions in response to records dropped onto said turntable and in correspondence with the respective diameters thereof, means operable at the beginning of each cycle for operating said indexing means from said normal position to the position thereof corresponding to the smallest diameter record tablet in said stack, means actuated by said indexing means following the dropping of a record tablet for urging said tone arm into an initial reproducing position corresponding to the diameter of the record tablet so dropped on the turntable during a cycle and means operable in response to the position of said indexing means following the dropping of a record tablet for varying the speed of said turntable to the speed associated with the diameter of the record dropped, said last-named means comprising a bell crank having oppositely facing cam means controlled by said indexing means for urging said bell crank towards one of two alternative positions from an intermediate position, and means driven by said turntable including a follower element for engaging the respective one of said cams and carrying said bell crank to said one position so that the speed of the turntable is changed in the event a record differs in diameter from the next previous record dropped and means for clearing said follower element and said one cam from engagement with each other, in said one position.

8. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each record changing cycle for operating said indexing means from said normal position to the position thereof corresponding to the smallest diameter record tablet in said stack, said last mentioned means comprising a cam actuated rocker arm having vertical and horizontal movement for raising said tone arm and swinging said tone arm to an inoperative position at the initiation of each automatic record changing cycle and a follower element movable therewith, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameter of the record dropped, said last-named means including a bell crank adapted to be rotated by said rocker arm in one direction or selectively in the other depending upon the position of said indexing means, and an incline element for lowering said follower element into engagement with said bell crank and means for removing said last bell crank from operation when said indexing means is in position for the smallest record.

9. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each record changing cycle for operating said indexing means from said normal position to the position thereof corresponding to the smallest diameter record tablet in said stack, said last mentioned means comprising a cam actuated rocker arm having vertical and horizontal movement for raising said tone arm and swinging tone arm to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameter of the record dropped, said last-named means including a mechanism driven by said turntable comprising oppositely facing cams on an arm and a cooperating follower on the rocker arm operable to assume one position when a record of a particular diameter is dropped on the turntable and is moved to an alternate position when a record of larger diameter is dropped on the turntable.

10. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each record changing cycle for moving said indexing means from said normal position to the position thereof corresponding to the smallest diameter record tablet in said stack, said last mentioned means comprising a cam actuated rocker arm having vertical and horizontal movement for raising said tone arm and swinging said tone to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and cam and follower means operable in response to the position of said indexing means following the dropping of a record tablet for varying the speed of said turntable to the speed associated with the diameter of the record dropped, said last-named means including a movable member operable to assume one position when said indexing means is in its innermost position and be blocked from movement from said innermost position.

11. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable indexing means having a normal position and a position corresponding to each of a plurality of record diameters and being moved into such latter positions in response to records dropped onto said turntable and in correspondence with the respective diameters thereof, means operable at the beginning of each record changing cycle for operating said indexing means from said normal position to the position thereof corresponding to the smallest diameter record tablet in said stack, said last mentioned means comprising a cam actuated rocker arm having vertical and horizontal movement for raising said tone arm and swinging said tone arm to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameter of the record dropped, said last-named means including a mechanism operable to be held in one position when said indexing means is in a position corresponding to that of the smallest record diameter and cam and follower elements movable by said turntable to another position when said indexing means is in a position corresponding to that of a record of larger diameter.

12. In a record changer having automatic cycles for the sequential playing of a plurality of record tablets of different diameters and reproducing speeds respectively corresponding to the diameters thereof, a rotatable turntable having means for releasably supporting a stack of record tablets above the turntable and means for dropping one of said tablets on said turntable during each cycle, a tone arm including a transducer adapted for vertical and horizontal swinging movement relative to said turntable, the combination of indexing means having a normal position and a position corresponding to each of a plurality of record diameters and being moved into such latter positions in response to records dropped onto said turntable and in correspondence with the respective diameters thereof, means operable at the beginning of each cycle for operating said indexing means from said normal position to the position thereof corresponding to the smallest diameter record tablet in said stack, means actuated by said indexing means in response to the position thereof following the dropping of a record for urging said tone arm into an initial reproducing position corresponding to the diameter of the record tablet so dropped on the turntable during a cycle, and means operable in response to the position of said indexing means for varying the speed of said turntable to the speed associated with the diameter of the record dropped, said last-named means including a mechanism moved from an intermediate position in one direction to one position when a record of a particular diameter is dropped on the turntable and in another direction to another position when a record of larger diameter is dropped on the turntable and cam and follower means driven by said turntable for displacing said mechanism further in the same direction from the respective positions and thereupon engaging, and lost motion means connected to the last mentioned means and accommodating return movement of said mechanism to said intermediate position.

13. In a record changer having automatic cycles for the sequential playing of a plurality of record tablets of different diameters and reproducing speeds respectively corresponding to the diameters thereof, a rotatable turntable having means for releasably supporting a stack of record tablets above the turntable and means for dropping one of said tablets on said turntable during each cycle, a tone arm including a transducer adapted for vertical and horizontal swinging movement relative to said turntable, the combination of indexing means having a normal position and a position corresponding to each of a plurality of record diameters, and being moved into such latter positions in response to records dropped onto said turntable and in correspondence with respective diameters, means operable at the beginning of each cycle for operating said indexing means from said normal position thereof to the position corresponding to the smallest diameter record tablet in said stack, means actuated by said indexing means in response to the position thereof following the dropping of a record for urging said tone arm into an initial reproducing position corresponding to the diameter of the record tablet so dropped on the turntable during a cycle, and means operable in response to the position of said indexing means for varying the speed of said turntable to the speed associated with the diameters of the record dropped, said last-named means including a bell crank and a lost motion link connected thereto permitting initial movement of the bell crank selectively in one of two alternate directions, and means including a cam on the bell crank and a follower driven by said actuated means for moving said bell crank beyond said initial movements to actuate said lost motion link operable to assume one position when said indexing means is in one position and another position when said indexing means is in another position.

14. In a record changer having automatic cycles for the sequential playing of a plurality of record tablets of different diameters and reproducing speeds respectively corresponding to the diameters thereof, a rotatable turntable having means for releasably supporting a stack of record tablets above the turntable and means for dropping one of said tablets on said turntable during each cycle, a tone arm including a transducer adapted for vertical and horizontal swinging movement relative to said turntable, the combination of indexing means having a normal position and a position corresponding to each of a plurality of record diameters and being moved into such latter positions in response to records dropped onto said turntable and in correspondence with respective diameters thereof, means operable at the beginning of each cycle for operating said indexing means from said normal position to the position thereof corresponding to the smallest diameter record tablet in said stack, means actuated by said indexing means in response to the position thereof following the dropping of a record for urging said tone arm into an initial reproducing position corresponding to the diameter of the record tablet so dropped on the turntable during a cycle and means operable in response to the position of said indexing means for varying the speed of said turntable to the speed associated with the diameters of the record dropped, said last-named means including a mechanism having cam and follower element operable to assume one position when said indexing means is in a position corresponding to that of the smallest record diameter and another position when said indexing means is in a position corresponding to that of a record of larger diameter said cam and follower elements being disengaged from each other during the playing of a record.

15. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each record changing cycle for operating said indexing means from said normal position to the position thereof corresponding to the smallest diameter record tablet in said stack, said last-mentioned means comprising a cam actuated rocker arm having vertical and horizontal movement for raising said tone arm and swinging said tone arm to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameters of the record dropped, said last-named means including a mechanism having cams arranged for movement from an intermediate position to alternate positions in the path of travel of said rocker arm and adapted to be directed in one direction when said indexing means is in one position and in the opposite direction when said indexing means is in another position.

16. An automatic record changer for the sequential playing of a plurality of records of different diameters and reproducing speeds respectively corresponding to the diameters thereof comprising a rotatable turntable having means for releasably supporting a stack of record tablets above the turntable and means for dropping one of said tablets on said turntable during each automatic record changing cycle, a tone arm including a transducer adapted for vertical and horizontal swinging movement relative to said turntable, indexing means having a normal position and a position corresponding to each of a plurality of record diameters and being moved into such latter positions in response to records dropped onto said turntable and in correspondence with the respective diameters thereof, means operable at the beginning of each record changing cycle for operating said indexing means from said normal position to the position thereof corresponding to the smallest diameter record tablet in said stack, said last mentioned means comprising a cam actuated rocker arm having vertical and horizontal movement for raising said tone arm and swinging said tone arm to an inoperative position at the initiation of each automatic record changing cycle, said indexing means being operative to limit the backswing of said tone arm during the movement thereof from said inoperative position to an operative position corresponding to the diameter of the record tablet dropped on the turntable during a particular record changing cycle, and means operable in response to the position of said indexing means following the dropping of a record tablet for varying the speed of said turntable to the speed associated with the diameter of the record dropped, said last-named means including a bell crank actuable in one direction or the other from an intermediate position by said pin depending upon the position of said indexing means, said bell crank having a pointed arm bent downwardly to facilitate disengagement of said pin to permit said bell crank to return to its intermediate position during the playing of a record.

References Cited in the file of this patent

UNITED STATES PATENTS

| | | |
|---|---|---|
| 2,632,650 | Offutt | Mar. 24, 1953 |
| 2,652,258 | Dale et al. | Sept. 15, 1953 |
| 2,752,159 | Bacher | June 26, 1956 |